(12) United States Patent
Endoh et al.

(10) Patent No.: US 8,790,429 B2
(45) Date of Patent: *Jul. 29, 2014

(54) REACTOR FOR POLYCRYSTALLINE SILICON AND POLYCRYSTALLINE SILICON PRODUCTION METHOD

(75) Inventors: Toshihide Endoh, Suzuka (JP); Toshiyuki Ishii, Yokkaichi (JP); Masaaki Sakaguchi, Suzuka (JP); Naoki Hatakeyama, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,181

(22) Filed: Jun. 27, 2012

(65) Prior Publication Data

US 2012/0266820 A1 Oct. 25, 2012

Related U.S. Application Data

(62) Division of application No. 12/232,612, filed on Sep. 19, 2008, now Pat. No. 8,231,724.

(30) Foreign Application Priority Data

Sep. 20, 2007 (JP) ................. 2007-244352
Jul. 8, 2008 (JP) ................. 2008-177980

(51) Int. Cl.
*B24D 3/00* (2006.01)
*B24D 11/00* (2006.01)
*B24D 18/00* (2006.01)
*C09K 3/14* (2006.01)
*B24D 3/02* (2006.01)
*C09C 1/68* (2006.01)

(52) U.S. Cl.
USPC ................. 51/293; 51/307; 51/309

(58) Field of Classification Search
USPC .......................... 117/1, 200, 84, 88
See application file for complete search history.

(56) References Cited

U.S. PATENT DOCUMENTS

| 3,011,877 A | * | 12/1961 | Reuschel et al. ............. 422/199 |
| 3,058,812 A | * | 10/1962 | Longini et al. ............... 427/588 |
| 3,099,534 A | * | 7/1963 | Scheickert et al. ........... 423/346 |
| 4,311,545 A | | 1/1982 | Bugl et al. |
| 8,231,724 B2 | * | 7/2012 | Endoh et al. .................... 117/1 |

FOREIGN PATENT DOCUMENTS

| EP | 0728529 | 8/1996 |
| GB | 914042 A | 12/1962 |

(Continued)

OTHER PUBLICATIONS

European Search Report dated Apr. 27, 2009, issued on the corresponding European patent application No. 08164540.0.

(Continued)

*Primary Examiner* — James McDonough
(74) *Attorney, Agent, or Firm* — Edwards Wildman Palmer LLP

(57) ABSTRACT

The reactor for polycrystalline silicon is a reactor for polycrystalline silicon in which a silicon seed rod installed inside the reactor is heated by supplying electricity, a raw material gas supplied inside the reactor is allowed to react, thereby producing polycrystalline silicon on the surface of the silicon seed rod, and specifically, the reactor for polycrystalline silicon is provided with a raw material gas supply port installed on the bottom of the reactor and a raw material gas supply nozzle attached to the raw material gas supply port so as to be communicatively connected and extending upward, in which the upper end of the raw material gas supply nozzle is set to a height in a range from −10 cm to +5 cm on the basis of the upper end of the electrode which retains the silicon seed rod.

6 Claims, 4 Drawing Sheets

(56) References Cited

FOREIGN PATENT DOCUMENTS

| | | |
|---|---|---|
| GB | 922280 A | 3/1963 |
| JP | 57-12288 B2 | 3/1982 |
| JP | 2867306 | 6/1993 |

OTHER PUBLICATIONS

Office Action dated Feb. 24, 2010, issued on the European Patent Application No. 08164540.0.

Office Action dated Sep. 7, 2011, issued for U.S. Appl. No. 12/232,612.

Notice of Allowance dated Apr. 2, 2012, issued for U.S. Appl. No. 12/232,612.

Notice of Allowance dated Jul. 6, 2012, issue for the corresponding Russian Patent Application No. 2008137427 and English translation thereof.

Japanese Office Action dated May 14, 2013 for corresponding Japanese Application No. 2008-239033.

* cited by examiner

REACTOR FOR POLYCRYSTALLINE SILICON AND POLYCRYSTALLINE SILICON PRODUCTION METHOD

CROSS-REFERENCE TO RELATED APPLICATIONS

This application is a divisional application of U.S. patent application Ser. No. 12/232,612, filed Sep. 19, 2008 which claims priority to Japanese Patent Application No. 2007-244352 filed on Sep. 20, 2007, and Japanese Patent Application No. 2008-177980 filed on Jul. 8, 2008.

BACKGROUND OF THE INVENTION

1. Field of the Invention

The present invention relates to a reactor for polycrystalline silicon used in producing polycrystalline silicon according to the Siemens method, and relates to a polycrystalline silicon production method.

2. Description of Related Art

The Siemens method is known as a method for producing polycrystalline silicon of high purity used as a material of semiconductors. In the Siemens method, a raw material gas composed of chlorosilane and hydrogen is brought into contact with a heated silicon seed rod to deposit polycrystalline silicon on the surface through reactions of the raw material gas. A reactor for polycrystalline silicon in which many silicon seed rods are installed upright in a reactor is used as an apparatus for carrying out this production method. In general, the silicon seed rod is formed in a n-shape, with upper ends being coupled, and both lower ends thereof are fixed to an electrode mounted on the bottom of the reactor.

Then, electricity is supplied through the electrode located on both ends to a whole part of the silicon seed rod, thereby heating the silicon seed rod in its entirety by Joule heat thereof to a temperature at which the raw material gas is thermally decomposed (for example, from about 1050° C. to 1100° C.). The raw material gas supplied into the reactor is in contact with the surface of the heated silicon seed rod to cause thermal decomposition or hydrogen reduction, thereby polycrystalline silicon is deposited on the surface of the silicon seed rod. This reaction proceeds continuously, by which polycrystalline silicon grows in a column-shape (refer to Japanese Patent No. 2867306, for example).

Into the reactor for polycrystalline silicon, a raw material gas is in general supplied from the bottom of the reactor. The raw material gas is supplied from a raw material gas supply port installed at the bottom of the reactor so as to be uniformly dispersed to all silicon seed rods in the reactor.

Incidentally, when a raw material gas is directly blown toward the lower part of the column-shaped polycrystalline silicon heated by supply of electricity, the temperature of the lower part decreased compared to that of the other part, thereby the speed for growing polycrystalline silicon deposited on the surface of the column-shaped polycrystalline silicon is decreased. As a result, the lower part of the column-shaped polycrystalline silicon may be partially recessed to result in undesirable morphology. Further, the raw material gas is not sufficiently supplied and stagnates at the upper part of the column-shaped polycrystalline silicon. Thus, popcorn-like irregularities may be developed on the surface of silicon to result in undesirable morphology. When the undesirable morphology is generated, polycrystalline silicon may be deteriorated in quality to result in a lower yield.

The present invention has been made in view of the above situation, an object of which is to provide a reactor for polycrystalline silicon capable of supplying stably a raw material gas to the surface of a silicon seed rod and preventing the undesirable morphology of polycrystalline silicon.

SUMMARY OF THE INVENTION

The reactor for polycrystalline silicon of the present invention is a reactor for polycrystalline silicon in which a silicon seed rod installed inside the reactor is heated by supplying electricity, and a raw material gas supplied inside the reactor is allowed to react, thereby producing polycrystalline silicon on the surface of the silicon seed rod. A raw material gas supply nozzle extending upward is attached to a raw material gas supply port installed at the bottom of the reactor so as to be communicatively connected, and the upper end of the raw material gas supply nozzle is set to a height in a range from −10 cm to +5 cm on the basis of the upper end of the electrode which retains the silicon seed rod. In other words, a height from the upper end of the electrode which retains the silicon seed rod to the upper end of the raw material gas supply nozzle is −10 cm or more to +5 cm or less.

The raw material gas supply nozzle is attached to the raw material gas supply port for supplying a raw material gas into the reactor for polycrystalline silicon so as to be communicatively connected, by which the raw material gas is to be supplied into the reactor for polycrystalline silicon via the raw material gas supply nozzle. In this instance, when the upper end of the raw material gas supply nozzle extending upward is set to a height greater than +5 cm on the basis of the upper end of the electrode retaining the silicon seed rod, the raw material gas is difficult to supply to the lower part of the silicon seed rod, and there is a concern that undesirable morphology may take place at the lower part of the produced column-shaped polycrystalline silicon. On the other hand, when the upper end of the raw material gas supply nozzle is set to a height less than −10 cm on the basis of the upper end of the electrode, the raw material gas is less likely to arrive at the upper part inside the reactor, thereby the undesirable morphology may be formed easily at the upper part of the column-shaped polycrystalline silicon.

In the present invention, with the above matters taken into account, the upper end of the raw material gas supply nozzle is set to a height in a range from −10 cm to +5 cm on the basis of the upper end of the electrode. Thereby, it is possible to supply uniformly the raw material gas to a whole area of the silicon seed rod from the upper part to the lower part. As a result, it is possible to effectively prevent the produced column-shaped polycrystalline silicon from formation of undesirable morphology.

Further, in the reactor for polycrystalline silicon of the present invention, it is preferable that the upper end of the raw material gas supply nozzle be set to a height in a range from −5 cm to +1 cm on the basis of the upper end of the electrode which retains the silicon seed rod. In other words, a height from the upper end of the electrode retaining the silicon seed rod to the upper end of the raw material gas supply nozzle is preferably −5 cm or more to +1 cm or less.

In the present invention, a height of the upper end of the raw material gas supply nozzle is at the highest about 1 cm higher than the upper end of the electrode. Therefore, there is no chance that the lower face of a movable work table used in removing the silicon rod from the electrode together with the produced polycrystalline silicon hits on the upper end of the raw material gas supply nozzle, thus making it possible to smoothly take out polycrystalline silicon. Further, during the work of removing the silicon rod from the electrode, it is possible to decrease such a risk that polycrystalline silicon may hit the raw material gas supply nozzle. On the other hand, since a height of the upper end of the raw material gas supply nozzle is at the lowest about 5 cm lower on the basis of the upper end of the electrode, it is possible to supply a sufficient quantity of the raw material gas to the upper space inside the reactor.

Further, in the reactor for polycrystalline silicon of the present invention, it is preferable that the raw material gas supply nozzle be formed in a tapered cylindrical shape having an outer circumferential side face which is reduced in diameter as close to an upper end thereof.

The raw material gas supply nozzle is formed in a tapered shape in which the outer circumferential side face is reduced in diameter upward. Therefore, it is possible to greatly decrease a volume percentage of the raw material gas supply nozzle in the reactor. For example, when a silicon rod is removed from the electrode, it is possible to decrease such a risk that the silicon rod may hit the raw material gas supply nozzle. As a result, it is possible to perform the work smoothly.

Further, when broken pieces of polycrystalline silicon deposited on the surface of a silicon seed rod fall from above, the broken pieces will fall so as to slide along the tapered face of the raw material gas supply nozzle. Therefore, it is possible to avoid damage of the raw material gas supply nozzle. Still further, with the flow of a raw material gas supplied from the raw material gas supply nozzle to the upper space inside the reactor, the raw material gas remaining at the lower part inside the reactor is guided to the upper part along the tapered face. Thus, it is possible to effectively utilize the raw material gas remaining at the lower part in production for polycrystalline silicon.

Still further in the reactor for polycrystalline silicon of the present invention, the raw material gas supply nozzle may comprise a nozzle main body and a nozzle head which is installed to the tip of the nozzle main body in a removable manner.

In the production of polycrystalline silicon, since silicon is deposited on the tip of the raw material gas supply nozzle as well to reduce the inner diameter of the nozzle, silicon is removed from the raw material gas supply nozzle by chipping or the like after the production of polycrystalline silicon is completed. In this instance, the nozzle tip is liable to breakage. In the reactor for polycrystalline silicon of the present invention, the nozzle head is installed in a removable manner, thereby only the nozzle head may be exchanged. It is, therefore, possible to effectively use the main body thereof.

A polycrystalline silicon production method of the present invention, including: heating a silicon seed rod installed inside a reactor for polycrystalline silicon by supplying electricity; and reacting a raw material gas supplied inside the reactor through a raw material gas supply port installed on the bottom of the reactor and a raw material gas supply nozzle which extends upward and which is attached to the raw material gas supply port so as to be communicatively connected, thereby producing polycrystalline silicon on the surface of the silicon seed rod; wherein the upper end of the raw material gas supply nozzle is set to a height in a range from −10 cm to +5 cm on the basis of the upper end of the electrode which retains the silicon seed rod.

According to the reactor for polycrystalline silicon of the present invention, it is possible to stably supply a raw material gas to the surface of a silicon seed rod and prevent polycrystalline silicon from formation of undesirable morphology.

DESCRIPTION OF THE PREFERRED EMBODIMENTS

Figure 1:
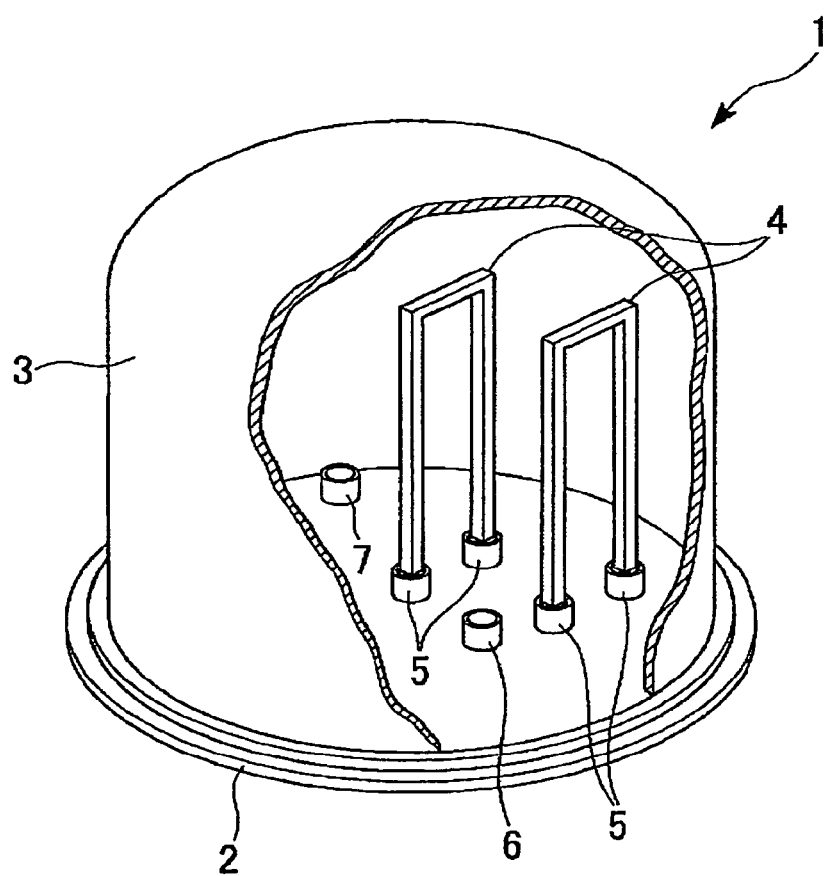
FIG. 1 is a schematic pattern diagram of a reactor for polycrystalline silicon.
Figure 2:
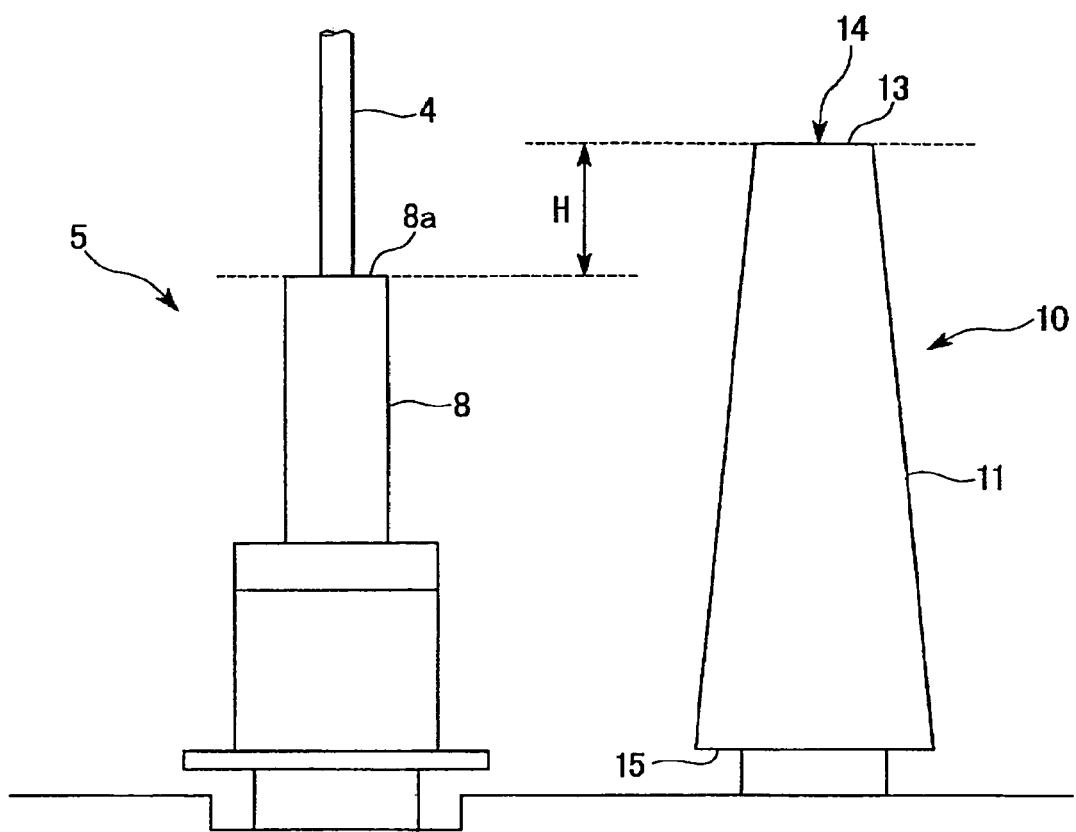
FIG. 2 is a side elevational view showing a raw material gas supply nozzle and an electrode in the reactor for polycrystalline silicon.
Figure 3:
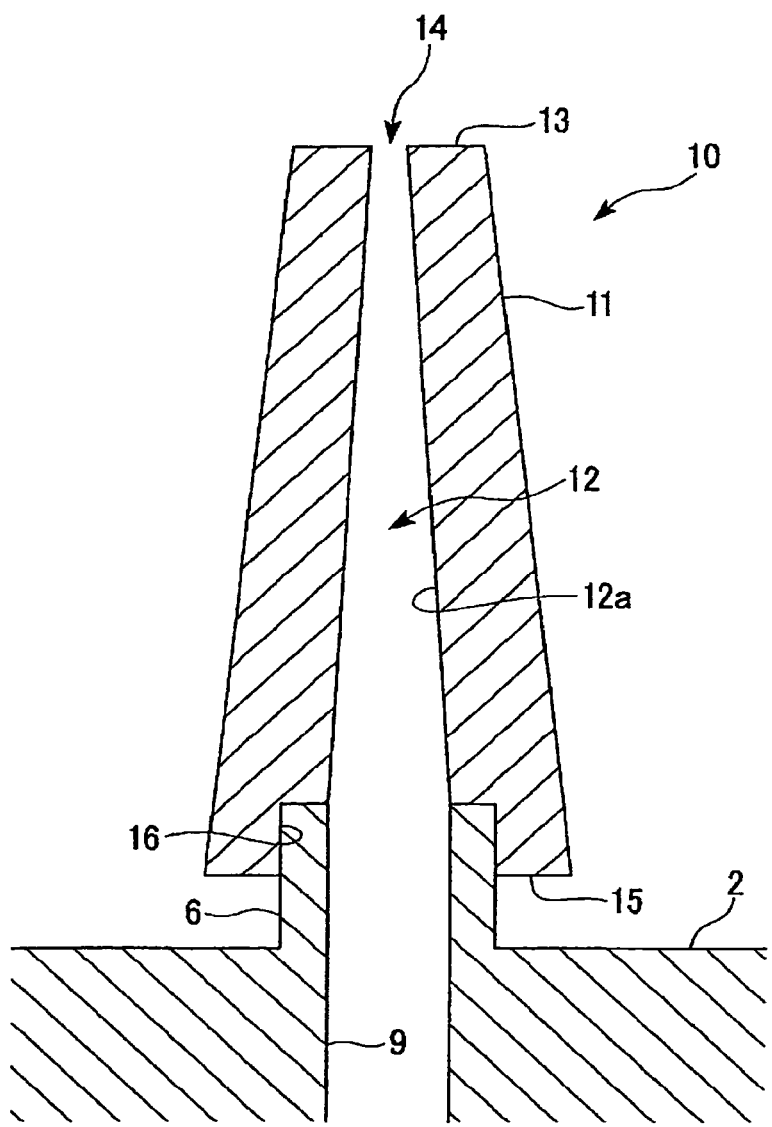
FIG. 3 is a longitudinal sectional view showing the raw material gas supply nozzle of the reactor for polycrystalline silicon.

Hereinafter, an explanation will be made of a reactor for polycrystalline silicon which is an embodiment of the present invention by referring to drawings. FIG. 1 is a schematic pattern diagram of the reactor for polycrystalline silicon. FIG. 2 is a side elevational view showing a raw material gas supply nozzle and an electrode used in the reactor for polycrystalline silicon. FIG. 3 is a longitudinal sectional view of the raw material gas supply nozzle.

As shown in FIG. 1, the reactor for polycrystalline silicon 1 of the present embodiment is provided with a bell jar 3 formed in a bell shape so as to cover entirely a space above the bottom of the reactor 2 mounted in a circular shape. The interior of the reactor for polycrystalline silicon 1 is sealed hermetically by the bottom of the reactor 2 and the bell jar 3. A plurality of silicon seed rods 4 which are formed approximately in a n-shape, with the upper ends being connected to each other, and serving as a seed rod of the produced polycrystalline silicon are installed upright in the hermetically sealed interior. Both base ends of the silicon seed rod 4 are supported by the electrode 5 on the bottom of the reactor 2.

The electrode 5 is made of carbon and formed approximately in a multi-stage cylindrical shape. A seed-rod retaining electrode 8 is arranged at the upper part of the electrode 5. An opening of a predetermined depth is provided at an upper end 8a of the seed-rod retaining electrode 8. One end of the silicon seed rod 4 is inserted into the opening, by which the silicon seed rod 4 is firmly retained by the seed-rod retaining electrode 8 of the electrode 5.

Further, a plurality of raw material gas supply ports 6 are formed on the bottom of the reactor 2 so that a cylindrical opening is allowed to face upward. The raw material gas supply port 6 supplies a raw material gas which is a mixed gas of chlorosilane with hydrogen to the silicon seed rod 4 inside the reactor for polycrystalline silicon 1. A plurality of the raw material gas supply ports 6 are arranged at appropriate intervals with each other in such a manner that the raw material gas can be supplied uniformly to a plurality of the silicon seed rods 4. As shown in FIG. 3, the raw material gas supply port 6 is connected to a raw material gas supply channel 9 opened on the bottom of the reactor 2. The raw material gas supply channel 9 is connected to a supply source of the raw material gas via a flow rate control valve (not illustrated). Therefore, the raw material gas is delivered to the raw material gas supply port 6 via the raw material gas supply channel 9, while the supply rate is controlled by the flow rate control valve.

Then, as shown in FIG. 2 and FIG. 3, a raw material gas supply nozzle 10 made of carbon is attached at the upper part of the raw material gas supply port 6. The raw material gas supply nozzle 10 is formed in a tapered cylindrical shape so that the outer circumferential side face 11 and the inner circumferential side face 12a of a through-hole 12 installed on the interior are reduced in diameter upward. The through-hole 12 is opened on a minor diameter face 13, which is the tip of the tapered part, and an opening 14 is formed on the minor diameter face 13.

Further, on a major diameter face 15 which is the end face on the opposite side of the minor diameter face 13, a cylindrical hole 16 having a central axis which is aligned with a central axis of the through-hole 12 is formed. Then, the cylindrical hole 16 is fitted into the raw material gas supply port 6, by which the raw material gas supply nozzle 10 is attached to the raw material gas supply port 6. A height of the minor diameter face 13, which is the upper end of the raw material gas supply nozzle 10, is set so that a relative height H with respect to the upper end 8a is in a range from −10 cm to +5 cm on the basis of a height of the upper end 8a of the seed-rod retaining electrode 8 of the electrode 5. It is more preferable that the height H be set in a range from −5 cm to +1 cm. In the present embodiment, in order to satisfy the above conditions, a height of the minor diameter face 13 at the upper end of the raw material gas supply nozzle 10 is set to be approximately equal to that of the upper end 8a (H≈0) on the basis of the upper end 8a of the electrode 5.

At the bottom of the reactor 2a discharge port 7 is provided for discharging a gas developed after the raw material gas supplied from the raw material gas supply port 6 reacts on the silicon seed rod 4. A plurality of the discharge ports 7 are arranged at appropriate intervals so that the gas after the reaction can be uniformly discharged.

In the present embodiment, the raw material gas supply nozzle 10 is attached to the raw material gas supply port 6 for supplying a raw material gas into the reactor for polycrystalline silicon 1 so as to be communicatively connected to the through-hole 12 of the raw material gas supply nozzle 10, by which the raw material gas is supplied into the reactor for polycrystalline silicon 1 via the raw material gas supply nozzle 10 from the opening 14. In this instance, in a case where the minor diameter face 13 at the upper end of the raw material gas supply nozzle 10 is set to be a height greater than 5 cm on the basis of the upper end 8a of the electrode 5, the raw material gas is less likely to be supplied to the lower part of the silicon seed rod 4. Therefore, there is a concern that undesirable morphology may be formed at the lower part of the produced column-shaped polycrystalline silicon. On the other hand, in a case where the upper end of the raw material gas supply nozzle 10 is set to be a height less than −10 cm on the basis of the upper end of the electrode 5, it is difficult that the raw material gas arrives at the upper part inside the reactor. Therefore, the u undesirable morphology may be formed easily at the upper part of the column-shaped polycrystalline silicon.

In the present embodiment, with the above matters taken into account, a height of the minor diameter face 13 at the upper end of the raw material gas supply nozzle 10 is set to be approximately equal to that of the upper end 8a on the basis of the upper end 8a of the electrode 5. In other words, since the height H satisfies the condition that it is included in a range from −10 cm or more to +5 cm or less, the raw material gas can be delivered uniformly in a whole area of the silicon seed rod 4 from the upper part to the lower part. As a result, it is possible to effectively prevent the produced column-shaped polycrystalline silicon from formation of undesirable morphology.

Further, since the height of the minor diameter face 13 at the upper end of the raw material gas supply nozzle 10 also satisfies the condition that the height H is included in a range from −5 cm to +1 cm on the basis of the upper end 8a of the electrode 5, there is no chance that the lower face of a movable work table used in removing the silicon rod from the electrode 5 is in contact with the upper end of the raw material gas supply nozzle 10. As a result, it is possible to work smoothly. During the work, it is also possible to decrease such a risk that polycrystalline silicon may contact the raw material gas supply nozzle 10. On the other hand, the raw material gas can be supplied enough to the upper part inside the reactor.

Still further, since the outer circumferential side face 11 of the raw material gas supply nozzle 10 is formed in a tapered shape which reduces in diameter upward, it is possible to greatly decrease a volume percentage of the raw material gas supply nozzle 10 in the reactor. Thereby, when the silicon rod is removed from the seed-rod retaining electrode 8 of the electrode 5, it is possible to decrease such a risk that the silicon rod 4 may contact the raw material gas supply nozzle 10. As a result, it is possible to perform the work smoothly.

In addition, in a case where broken pieces of polycrystalline silicon deposited on the surface of the silicon seed rod 4 fall from above, the broken pieces will fall so as to slide along the tapered outer circumferential side face 11 of the raw material gas supply nozzle 10. Therefore, it is possible to avoid damage of the raw material gas supply nozzle 10. Further, with the flow of a raw material gas supplied from the raw material gas supply nozzle 10 to the upper space inside the reactor, the raw material gas remaining at the lower part inside the reactor is guided to the upper part along the tapered outer circumferential side face 11. Thus, it is possible to effectively utilize the raw material gas remaining at the lower part for production of polycrystalline silicon.

Next, an explanation will be made of the result of a study conducted for confirming the effect of the raw material gas supply nozzle 10.

In this study, a nozzle adjustable for the height of the raw material gas supply nozzle 10 to various levels on the basis of the upper end 8a of the electrode retaining portion as shown in Table 2 was fitted into the raw material gas supply port 6, and a raw material gas was supplied thereto.

In order to confirm the effect, an evaluation was made by the surface of column-shaped polycrystalline silicon. Polycrystalline silicon is given a pop-corn like surface when the raw material gas is insufficiently supplied. It is said that Polycrystalline silicon is determined to be higher in quality, if smoother. Therefore, the study was conducted to determine to what extent an area of the smooth surface would be changed depending on the height of the raw material gas supply nozzle.

Table 1 shows the conditions for producing polycrystalline silicon. The pop-corn like surface at the lower part of the deposited column-shaped polycrystalline silicon was measured for length as a lower-part undesirable morphology, and a part having a smooth surface at an intermediate part excluding the upper-part and lower-part undesirable morphology was measured for length as a surface smooth part. Then, a determination was made of a percentage of the length of the undesirable morphology, that of the length of the surface smooth part, and that of the length of the upper-part undesirable morphology. Table 2 shows how the percentage of length of the surface smooth part changes, depending on the height of the nozzle.

In Table 2, the height of the nozzle is expressed by a relative position of the electrode-retaining portion with respect to the upper end 8a.

Further, the percentage of the length of the lower-part undesirable morphology, that of the length of the upper-part undesirable morphology, and that of the length of the surface smooth part will be defined by the following formulae.

(Percentage of the length of lower-part undesirable morphology)=(length of lower-part undesirable morphology)/(length of seed before reaction)× 100 (%)

(Percentage of the length of the surface smooth part)=
(length of surface smooth part)/(length of seed
before reaction)×100 (%)

(Percentage of the length of the upper-part undesirable
morphology)=100−(percentage of the length of
the lower-part undesirable morphology)−(percentage of the length of surface smooth part) (%)

The percentage of the length of the upper-part undesirable morphology was calculated by the above formula, because as described above, the silicon seed rod was assembled in a inversed U-shape and each column-shaped polycrystalline silicon was determined in a state in which it was taken out, by which it was difficult to identify the border line accurately due to cracks or the like found at the upper coupling part formed in the inversed U-shape.

TABLE 1

Production conditions

| | | |
|---|---|---|
| Supply of raw material gas | Trichlorosilane | 216-228 Ton |
| | Hydrogen | 273,000-288,000 m$^3$ |
| Reaction time | | 114 hours to 119 hours |
| Outer diameter of column-shaped polycrystalline silicon | | 11.8-12.4 cm |

TABLE 2

| | Comparative example | Present invention | | | | | | | Comparative example |
|---|---|---|---|---|---|---|---|---|---|
| Height of nozzle (cm) (Relative height H to 8a) | −15 | −10 | −7 | −5 | 0 | +1 | +2 | +5 | +10 |
| Percentage of length of lower-part undesirable morphology (%) | 16.5 | 18.0 | 18.2 | 18.6 | 19.0 | 20.9 | 21.8 | 23.4 | 29.5 |
| Percentage of length of upper-part undesirable morphology (%) | 42.7 | 33.1 | 30.1 | 27.6 | 26.1 | 26.0 | 25.4 | 25.3 | 24.1 |
| Percentage of length of surface smooth part (%) | 40.8 | 48.9 | 51.7 | 53.8 | 54.9 | 53.1 | 52.8 | 51.3 | 46.4 |

As is apparent from Table 2, in a case where the height of the nozzle (relative height H) is in a range from −15 cm and +10 cm, a greater percentage of the upper-part or the lower-part undesirable morphology of column-shaped polycrystalline silicon is observed. Therefore, a percentage of the length of the intermediate surface smooth part is decreased to result in a poor product yield. On the other hand, in a case where the height of the nozzle (relative height H) is in a range from −10 cm to +5 cm, the surface smooth part can be occupied more than half the entire length of the column-shaped polycrystalline silicon, in particular, favorably in a case where the height is in a range from −5 cm to +1 cm.

Figure 4:
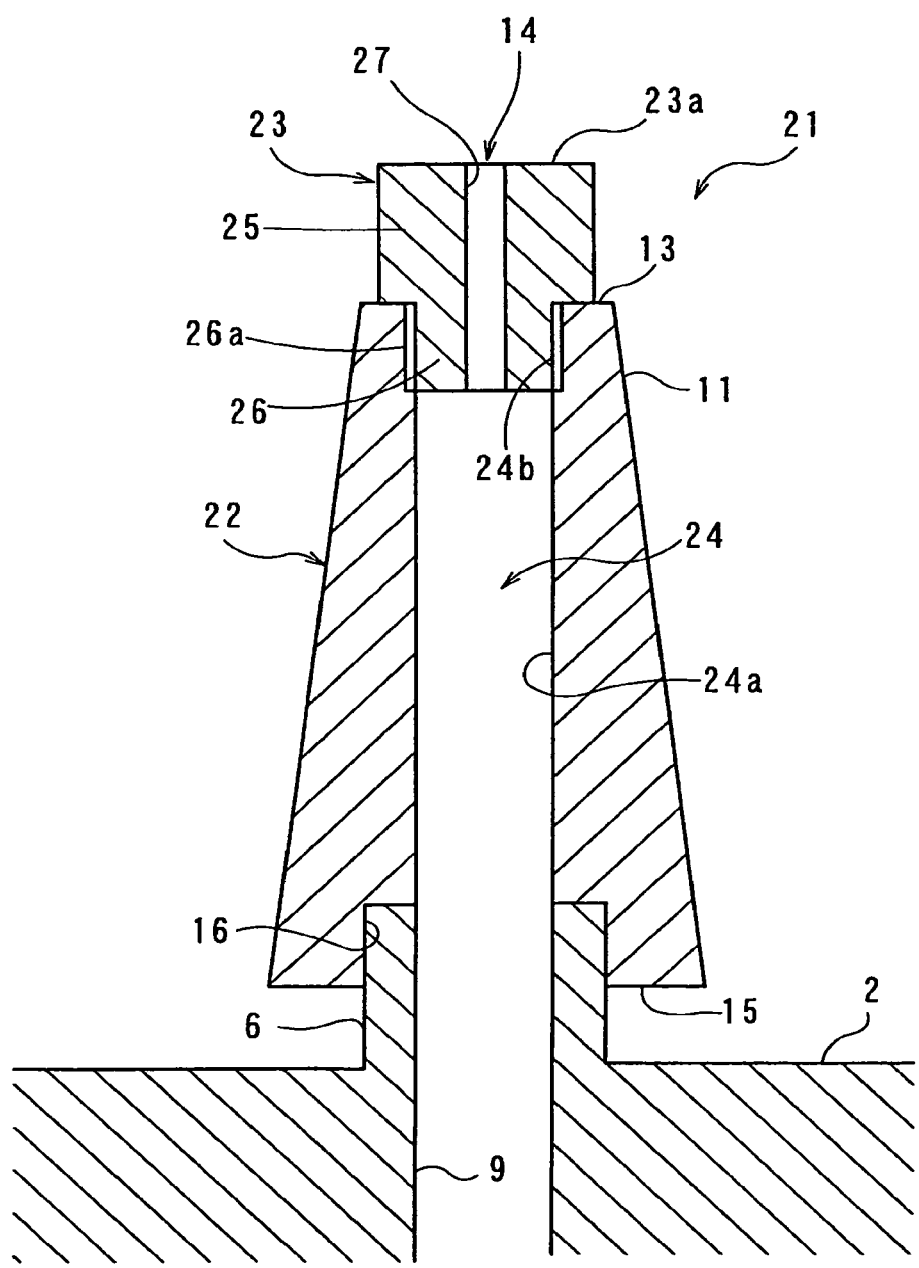
FIG. 4 is a longitudinal sectional view showing an exemplified variation of the raw material gas supply nozzle.

FIG. 4 shows an exemplified variation of the raw material gas supply nozzle of the present invention.

The raw material gas supply nozzle 21 is constituted with a nozzle main body 22 and a nozzle head 23. The nozzle main body 22 is formed in a tapered shaped in such a manner that the outer circumferential side face 11 thereof is reduced in diameter upward as with that shown in FIG. 3. However, the inner circumferential side face 24a of the through-hole 24 is formed in a straight shape. Further, a female thread portion 24b is formed at the upper end of the through-hole 24, and a nozzle head 23 is attached to the female thread portion 24b. The nozzle head 23 is formed so as to give a step between a major diameter portion 25 and a minor diameter portion 26. A male thread portion 26a, which is screwed into the female thread portion 24b of the nozzle main body 22, is formed at the minor diameter portion 26. Further, a through-hole 27 smaller in diameter than the through-hole 24 of the nozzle main body 22 is formed at the center of the nozzle head 23. In a state that the nozzle head 23 is screwed into the nozzle main body 22, both through-holes 24 and 27 are communicatively connected each other. The opening 14 as the raw material gas supply nozzle 21 is formed by the through-hole 27 of the nozzle head 23.

In the raw material gas supply nozzle 21, the upper end face 23a of the nozzle head 23 is set so that the relative height H is included in the above-described positional relationship on the basis of a height of the upper end 8a of the electrode 5, that is, in a range from −10 cm to +5 cm, preferably from −5 cm to +1 cm.

The constituted raw material gas supply nozzle 21 can be exchanged only for the nozzle head 23, if necessary, because the nozzle head 23 installed at the tip thereof is attached in a removable manner.

Since silicon is deposited at the tip of the raw material gas supply nozzle 21, for example, in association with production of polycrystalline silicon, such work is conducted so that the silicon deposited on the raw material gas supply nozzle 21 is removed after production of polycrystalline silicon is completed. However, the work to remove requires chipping or the like and the tip of the nozzle is liable to breakage. In the raw material gas supply nozzle shown in FIG. 3, it is necessary to exchange the nozzle in its entirety, if the tip is broken. However, in the raw material gas supply nozzle 21 shown in FIG. 4, only the nozzle head 23 may be exchanged and the nozzle main body 22 can be used again as it is. Further, in a case where the tip of the nozzle is damaged by rods of polycrystalline silicon or the like, the nozzle main body 22 can be used again by exchanging the nozzle head 23. Then, the cost of equipment can be reduced as compared with an integrally-built raw material gas supply nozzle shown in FIG. 3.

Further, the through-holes 27 of the nozzle head 23 are formed to be made available in various types that are different in diameter. Then, the nozzle head 23 is used selectively to adjust the diameter of the opening 14 on the nozzle outlet side, by which it is possible to keep constant the flow rate of gas from the raw material gas supply nozzle 21, irrespective of the number of the raw material gas supply ports 6. As a result, it is possible to keep to a smaller extent variation in the quality of the produced polycrystalline silicon.

An explanation has been so far made of the reactor for polycrystalline silicon 1, which is an embodiment of the present invention. The present invention shall not be, however, restricted thereto and may be modified in any way within a scope not departing from the technical idea of the present invention. For example, in the present embodiment, the cylindrical hole 16 of the raw material gas supply nozzle is fitted into the raw material gas supply port 6, by which the raw material gas supply nozzle is attached to the raw material gas supply port 6. However, a constitution may also be acceptable in which a female thread is made on the inner circumferential wall of the cylindrical hole 16, a male thread is made on the outer circumferential side face of the raw material gas supply port 6, and the male thread is screwed into the female thread, thereby the raw material gas supply nozzle 10 is attached to the raw material gas supply port 6.

What is claimed is:

1. A reactor for polycrystalline silicon in which a silicon seed rod installed inside the reactor is heated by supplying electricity, a raw material gas supplied inside the reactor is allowed to react, thereby producing polycrystalline silicon on the surface of the silicon seed rod, the reactor for polycrystalline silicon, comprising:
   a bottom of the reactor;
   a cylindrical raw material gas supply port installed upright on the bottom of the reactor;
   a cylindrical raw material gas supply nozzle which extends upward and is attached to the upper part of the raw material gas supply port so as to be communicatively connected to the raw material gas supply port, and
   electrodes which are provided on the bottom to retain the both end of the silicon seed rod;
   the upper end of the raw material gas supply nozzle being set to a height in a range from −10 cm to +5 cm on the basis of the upper end of the electrodes;
   the raw material gas supply nozzle having a lower end face having a diameter greater than that of the raw material gas supply port and facing to the bottom of the reactor, and
   a gap being made of the bottom of the reactor, an outer surface of the cylindrical raw material gas supply port and the lower end face of the raw material gas supply nozzle.

2. The reactor for polycrystalline silicon according to claim 1, wherein the upper end of the raw material gas supply nozzle is set to a height in a range from −5 cm to +1 cm on the basis of the upper end of the electrode which retains the silicon seed rod.

3. The reactor for polycrystalline silicon according to claim 1, wherein the raw material gas supply nozzle has a tapered cylindrical shape having an outer circumferential side face which is reduced in diameter as close to an upper end thereof.

4. The reactor for polycrystalline silicon according to claim 1, wherein the raw material gas supply nozzle comprises a nozzle main body and a nozzle head which is installed to the tip of the nozzle main body in a removable manner.

5. The reactor for polycrystalline silicon according to claim 1, wherein the raw material gas supply nozzle has a cylindrical hole formed in the lower end face, and the raw material gas supply port is fitted into the cylindrical hole in a detachable manner.

6. The reactor for polycrystalline silicon according to claim 1, wherein the raw material gas supply nozzle is made of carbon.

\* \* \* \* \*